2,766,637

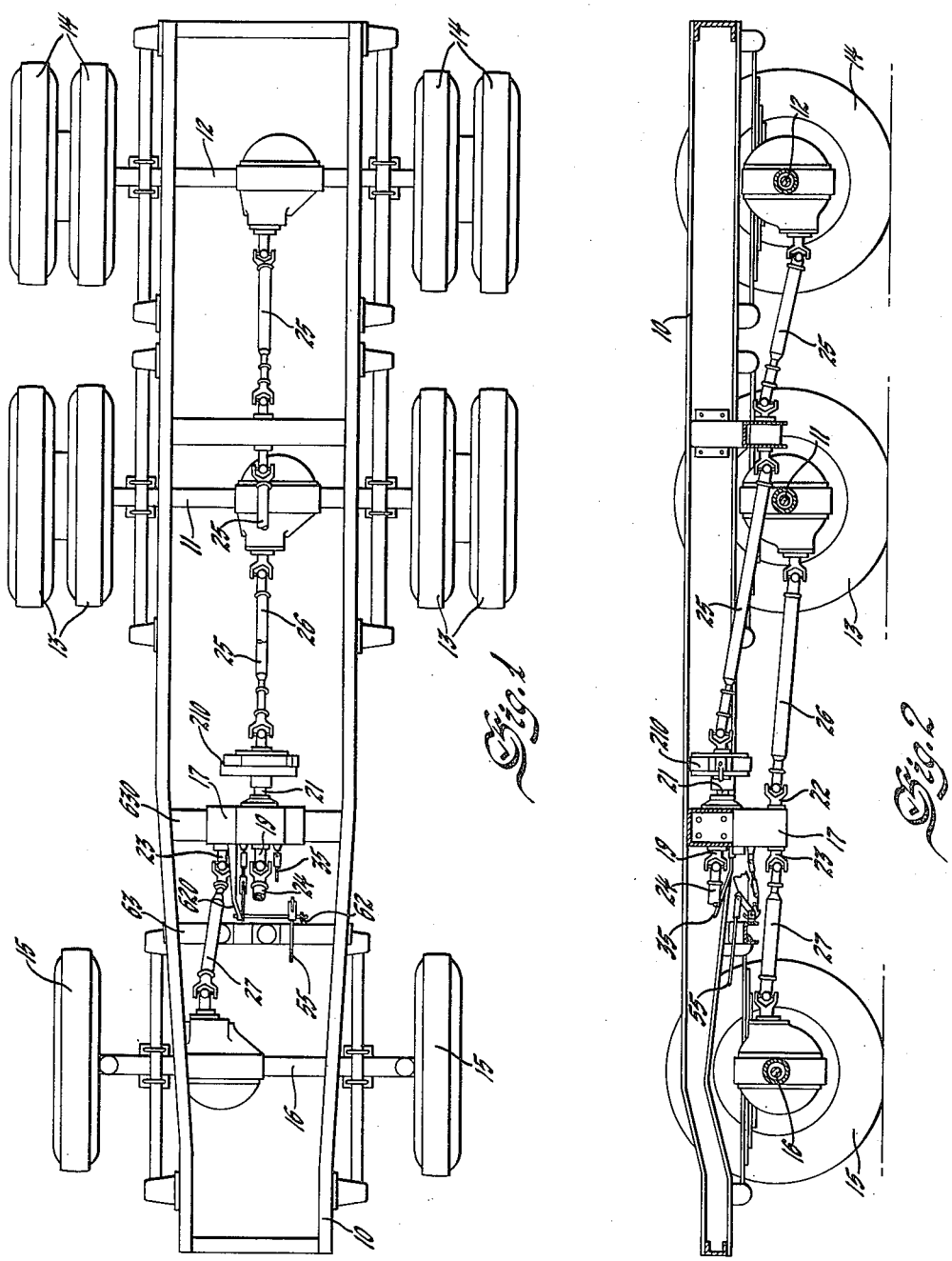

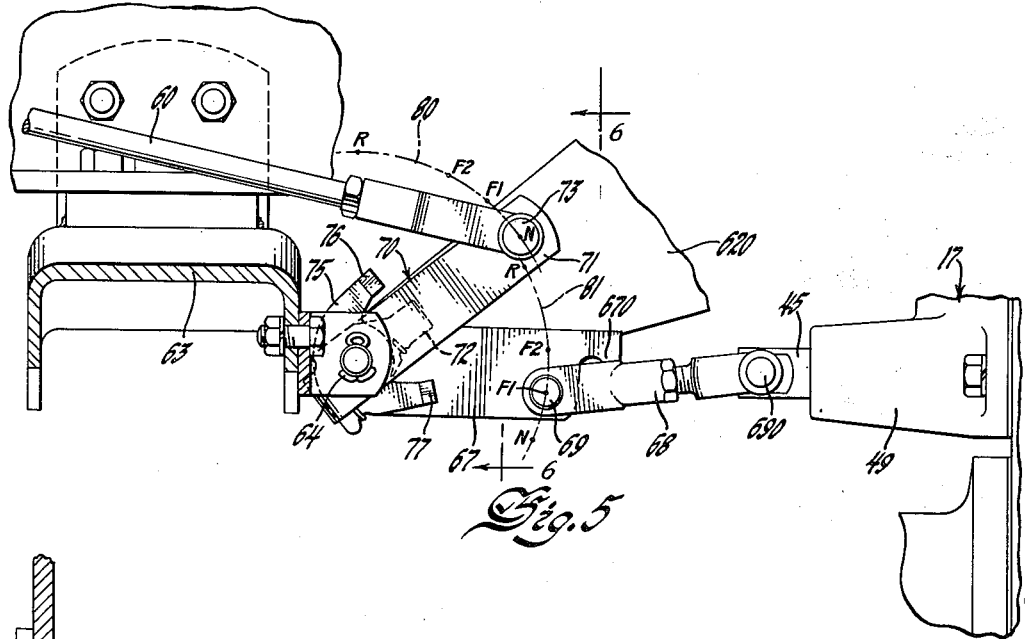
*Fig. 5*
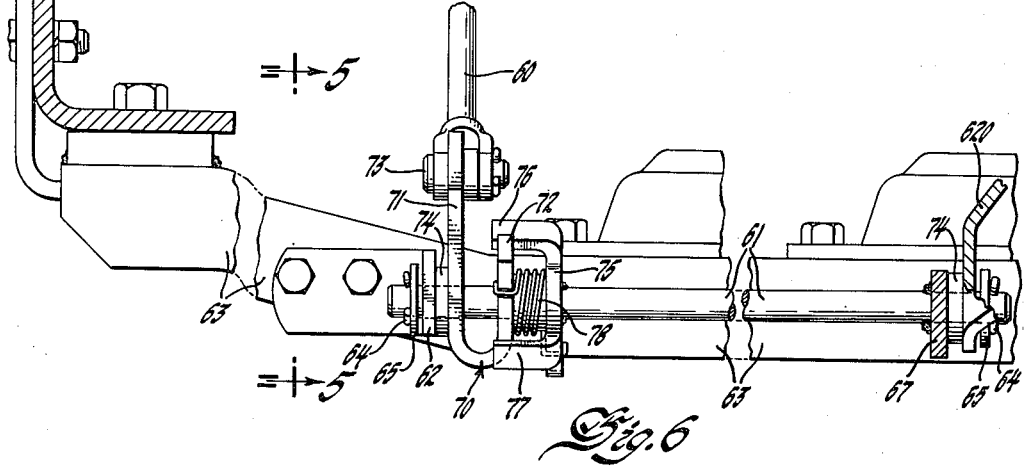
*Fig. 6*
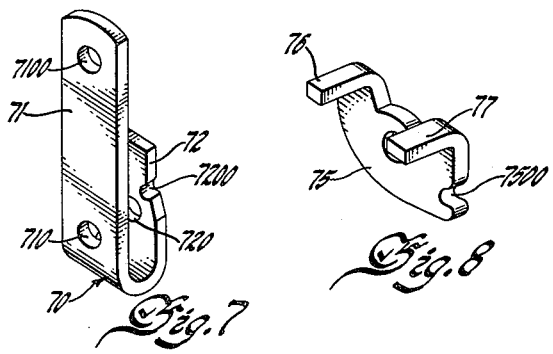
*Fig. 7*  *Fig. 8*
INVENTOR.
Carl J. Bock
BY
Willits, Helwig & Baillio
ATTORNEYS United States Patent Office 2,766,637
Patented Oct. 16, 1956

TRANSMISSION CONTROL MECHANISM

Carl J. Bock, Birmingham, Mich., assignor to General Motors Corporation, Detroit, Mich., a corporation of Delaware Application March 27, 1952, Serial No. 278,980

13 Claims. (Cl. 74—368)

This invention relates to transmission control mechanism and in particular to means for controlling shiftable elements in gearboxes, power transfer units, and the like.

This application is a continuation-in-part of application Serial No. 97,881, filed by Carl J. Bock on June 8, 1949, entitled "Motor Vehicle," now Patent No. 2,711,222, dated June 21, 1955.

Although the invention is disclosed and described herein in connection with power transfer units employing shiftable overrunning clutches to apply power directionally under manual control to the front wheel drive of vehicles in which both the rear wheels and front wheels are driven and wherein the front wheel drive is effective automatically responsive to loss of traction of the rear vehicle wheels, it is to be understood that the invention may be adapted to other types of vehicle transmission mechanisms.

In the vehicle construction employed to illustrate the invention, the rear non-steerable wheels and the front steerable wheels are all of the same diameter and are driven from a power source through a selective transmission unit and a power transfer unit having output shafts connected to front and rear axles in which the gearing is of the same ratio, the output shaft from the power transfer unit connected to the front axle running at a slightly slower speed than the output shafts from the power transfer unit connected to the rear axles. Overrunning clutches in the power transfer unit transmit power to the slower running output shaft, and are shifted by transmission control mechanism according to the direction of drive selected by the operator of the vehicle through the selective transmission.

With such construction, under normal driving conditions all of the tractive effort of the vehicle is applied through the rear drive wheels except when loss of traction of the rear drive wheels occurs, in which event, the rear wheels overrun the peripheral speed of the front wheels whereupon the front wheel drive becomes effective to assist the rear wheels. Thus, the vehicle operates under normal driving conditions as a rear wheel drive vehicle, and the front wheels assist the tractive effort of the rear wheels automatically when more traction is required as determined by traction slippage of the rear wheels.

The shifting of the overrunning clutches in the power transfer unit from forward to reverse and vice versa is preferably accomplished by the same shift mechanism which shifts the selective transmission from forward to reverse and vice versa. In the event the selective transmission unit is of an automatic type, such as the "Hydramatic" which requires the moving of its control lever to neutral to start the engine after a stall, and the vehicle is on an incline or under load at the time the engine stalls, which puts the ratchet teeth of the overrunning clutches in the power transfer unit under load, it is either impossible to shift the control lever of the automatic type selective transmission to neutral, or undue stress will have to be placed on the shift mechanism in an effort to accomplish the moving of the control lever of the automatic selective transmission unit to neutral.

Another difficulty encountered in motor vehicle transmissions of the type employing shiftable spring loaded forward and reverse overrunning ratchet clutch mechanism is that the shiftable clutch element may accidentally move or jump from forward to reverse or vice versa due to heavy road shocks thereby causing damage to the clutch elements and possibly to other elements of the transmission or drive mechanisms.

With the foregoing in view, one object of the invention is to provide improved means for shifting shiftable elements in gear boxes, power transfer units and the like.

Another object of the invention is to provide improved means for shifting a shiftable coupling element and spring loading the said shiftable coupling elment into its shifted position including means preventing the accidental movement of the shiftable coupling from one shifted position to the other.

Another object of the invention is to provide means for shifting a shiftable coupling in a power transfer or divided unit controlling the direction of rotation of the output shaft thereof responsive to movement of the control lever of a selective transmission unit, the shifting means permitting movement of the said transmission control mechanism in the event the power transfer or divider unit is under such a load as will prevent shifting of the shiftable coupling thereof.

Other objects of the invention will become apparent by reference to the following detailed description taken in connection with the accompanying drawings, in which:

Fig. 1 is a plan view of a vehicle showing running gear to which the invention is applicable.

Fig. 2 is a longitudinal sectional view of the construction shown in Fig. 1.

Fig. 5 is an elevational view taken on the line 5—5 of Fig. 6 of linkage preferably employed between the shift rod of the power transfer or divider unit and the control lever of an automatic type selective transmission unit (not shown).

Fig. 6 is a top plan view taken on the line 6—6 of Fig. 5.

Figs. 7 and 8 are views in perspective of elements of a lost motion device permitting movement of the control lever of the selective transmission when the shiftable clutch elements of the power transfer or divider unit are in load locked engagement.

Figures 3, 4:
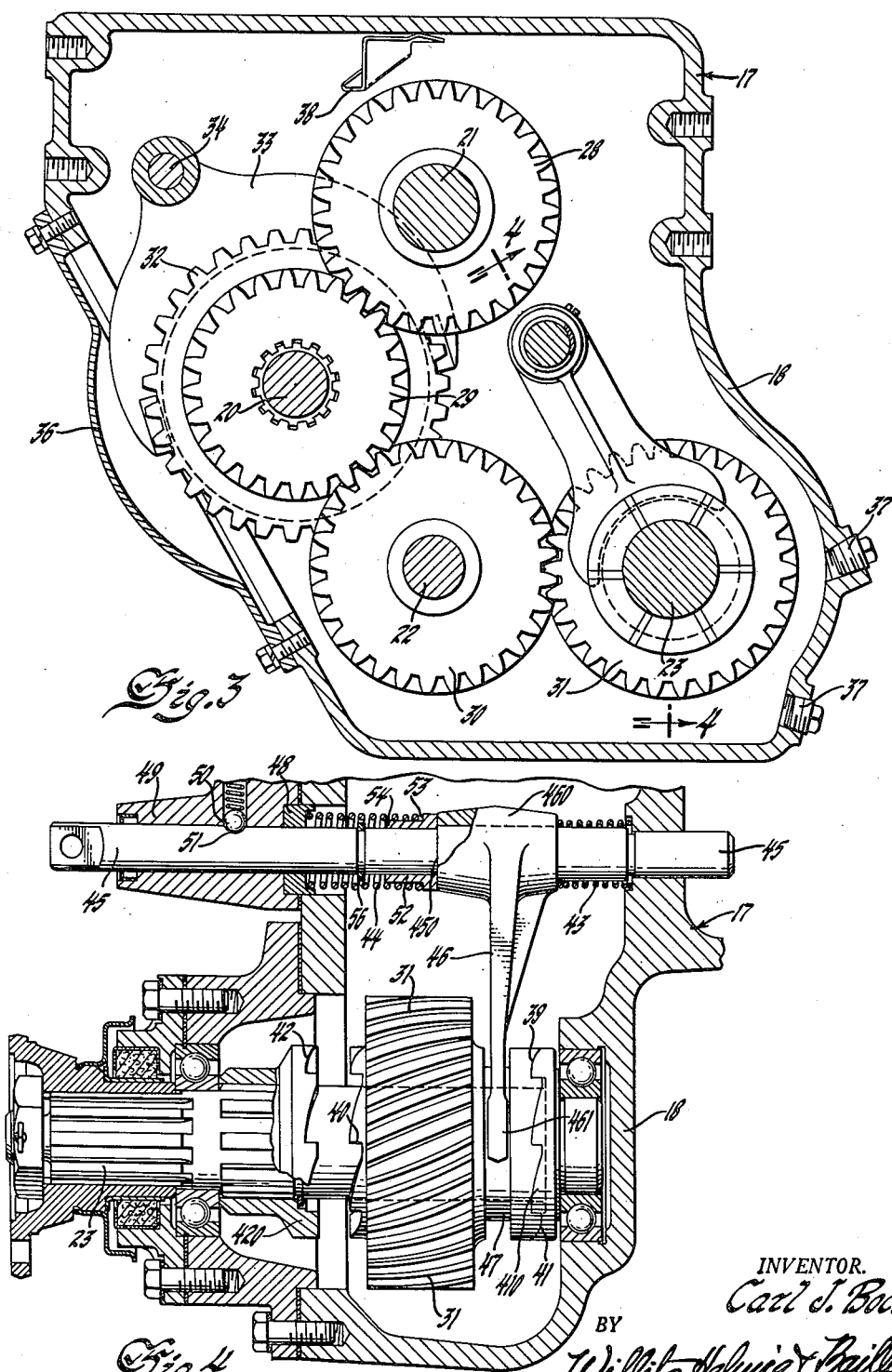
Fig. 3 is a sectional view through a power transfer or divider unit used to transmit power to the front and rear axles, which divider unit employs shiftable clutch elements controlled by mechanism embodying the invention.
Fig. 4 is a sectional view taken on the line 4—4 of Fig. 3.

The usual chassis frame 10 for mounting a load carrying body is illustrated in the drawings as being supported on front and rear axles, each having road wheels at the opposite ends. Tandem drive axles 11 and 12 each have dual wheels 13—13 and 14—14, respectively, at the opposite ends thereof, while single wheels 15—15 are dirigibly mounted for steering purposes on opposite ends of the front drive axle 16. These several wheels are all of the same diameter and preferably are identical and interchangeable with one another. Similarly, the gearing in the several axles is of the same ratio and is preferably of identical structure and includes differential mechanism. Each axle is joined by propeller shafting to a power transfer or power divider unit 17, which unit includes a housing 18 supported intermediate the ends of the chassis frame 10 and receives power from a driving source such as a conventional engine and a main change speed gearbox. For practical reasons the power divider unit is built as a separate unit, but, if desired, it could be readily combined with or incorporated in the main change speed gearbox.

Opposite end walls of the housing 18 of the power divider unit 17 are preferably formed with aligned openings in which bearings are suitably mounted for receiving an input shaft 19, a countershaft 20, a first output shaft 21, a second output shaft 22 and a third output shaft 23. The input shaft 19 is arranged to be coupled directly with the power delivery shaft 24 from the engine, only a part of which is shown. The power delivery shaft 24 is driven in both forward and reverse drive as determined by the drive setting of the main change speed gearbox. A service or parking brake 210 may be associated with the output shaft 21 which is coupled by suitable propeller shafting 25 with the rear drive axle 12. The other rear axle 11 is coupled by propeller shafting 26 with the output shaft 22, and similarly, the propeller shafting 27 couples the output shaft 23 with the front axle 16.

Associated with the several shafts inside the housing 18 is a train of constant mesh helical gears 28, 29, 30 and 31. The gear 28 is preferably formed integral with the inner end of the first output shaft 21. The gear 29 is separately formed but is keyed on the countershaft 20 for rotation therewith. The gear 30 is also separately formed and has a driving spline connection with the output shaft 22. The gear 31 is separately formed, and is mounted rotatably and for relative axial shifting movement on the output shaft 23. These several gears preferably are driven conjointly from the input shaft 19 through a two-speed selectively controlled gear arrangement of a well known type. This selective two-speed gear arrangement is not shown since it is not a part of the instant invention, however, it may comprise a pair of drive gears of different ratio formed on the input shaft and in constant mesh with driven gears rotatably mounted on the countershaft 20. The said drive gears are preferably provided on adjacent sides with jaw teeth for engagement by complementary clutch teeth disposed on a shift collar slidably splined on the countershaft 20. To control the said selective two-speed gear arrangement, a shifter fork 33 is mounted on a control rod 34 extending through the end wall of the housing 18 for connection by linkage 35 with a driven control lever whereby the clutch shift collar may be shifted in either direction from a neutral position for coupling the countershaft 20 to one or the other of the driven gears, the driven gear 32 being the only one shown in the drawing. The two-speed selectively controlled gear arrangement referred to above may or may not be employed as desired, and if not, the gear train consisting of helical gears 19, 20, 21 and 22 are driven by the input shaft 19 through any suitable gearing.

A power take-off device may be incorporated in the power transfer or divider unit 17 which has an opening in the housing 18 thereof for such purposes as shown in Fig. 3, which opening is closed by a suitable cover plate 36. Removal of this cover plate will permit substitution of a power take-off unit consisting of a housing supporting a power take-off shaft and gearing to be placed in driving mesh relationship with a suitable driven gear in the power transfer unit such as the driven gear 32. The power take-off gearing, when used, is preferably arranged to be selectively clutched with the power take-off shaft so that by proper operation of the vehicle controls, the power take-off mechanism may be driven from the engine whether or not the road wheels of the vehicle are being driven and in any drive setting of the main change speed gearbox.

Near the bottom and on the right hand side of the housing 18, as viewed in Fig. 3, are a pair of removable plugs 37 for lubricant drain and filling purposes. The lowermost gears of the gear train normally operate partially submerged in the lubricant supply within the housing 18 and splash the lubricant on other moving elements and the bearings therefor. A portion of the lubricant is carried by the constant mesh gears to an oil transfer trough 38 located at the top of the housing which leads the lubricant to and drops it directly onto gearing not located in the said gear train whereby to make certain that all of the moving parts in the upper part of the housing are adequately lubricated.

As it is shown in Figs. 3 and 4, the helical gear 31 is shiftably mounted on the output shaft 23 and has ratchet teeth 39 and 40 formed on opposite faces thereof. These ratchet teeth 39 and 40 are for clutching drive engagement, respectively, with mating ratchet teeth 41 and 42 formed on collars 410 and 420 respectively of the output shaft 23 in axial spaced apart relationship on opposite sides of the shiftable gear 31. One set of ratchets provide a one-way clutch drive to the front axle when the main change speed gearbox is set to drive the vehicle forward, and the other set of ratchets provide a one-way clutch drive for reverse or backward vehicle travel, all as determined by the main change speed gearbox setting.

The use of helical gearing provides an axial thrust on the shiftable gear 31 which aids in urging the ratchets 39 and 41 and 40 and 42 into engagement. As an additional clutch engaging force, a pair of opposed compression springs 43 and 44 are provided which are mounted on a shift rod 45, one on each side of the yoke 460 of a shifter fork 46. The yoke 460 of the shifter fork 46 is slidably mounted on the shift rod 45 while the bifurcated end 461 thereof is positioned in the annular groove 47 formed in the hub of the shiftable gear 31. The effectiveness of the respective opposed springs 43 and 44 is controlled by the position of the shift rod 45 which is slidably supported on opposite end walls of the housing 18. It will be observed that a bearing 48 and a sleeve 49 are provided at one end wall of the housing 18 to admit of assembly of the shift rod 45 within the housing 18 and to accommodate a spring loaded ball detent 50 which engages a groove 51 in the shift rod 45 when the shift rod 45 is moved to its forward drive position as shown in Fig. 4.

To the left of the yoke 460 of the shifter fork 46 as viewed in Fig. 4 is a spacer element 52 slidably mounted on the shift rod 45 to the left of a shoulder 450 thereon formed by reducing the diameter of the left end thereof. The spacer element 52 is provided with a spring seat 53 for the spring 44 and is of the proper length so that its annular shoulder 54 will contact a stop ring 56 suitably fixed on the shift rod 45 and serve to prevent accidental shifting of the gear 31 from its forward drive position shown in Fig. 4 to its reverse drive position.

Although a separate control lever may be used, by preference the shift rod 45 is connected by link means 55 to the manual shift lever, not shown, that controls the main gearbox and is arranged to pull the shift rod 45 to the left from the position shown in Fig. 4 whenever the main gearbox is in reverse setting. In all forward speed settings of the main gearbox the shift rod 45 is moved by the link means 55 to the position shown in Fig. 4 with the ball detent 50 engaged in the groove 51 in the shift rod 45.

When the shift rod 45 is moved to the left to its reverse drive position from the position thereof shown in Fig. 4, the spring 44 is compressed and taken out of effective action thereby permitting the spring 43 to come into action against the yoke 460 of the shifter fork 46 for resiliently urging the gear 31 along the shaft 23 for disconnecting the ratchet teeth 39—41 engaging the ratchet teeth 40—42. The spring 43 has sufficient strength to maintain the ratchet teeth 40—42 in driving engagement except when the rear wheels tend to overrun the front wheels, in which event, the spring 43 yields to allow the teeth 40 to be cammed out of engagement with the teeth 42 to accommodate the overrun.

When the shift rod 45 is moved to the right to its forward drive position shown in Fig. 4, the spring 44 is free to come into action through the spacer element 52 against the yoke 460 of the shifter fork 46 for resiliently urging the gear 31 along the shaft 23 for disconnecting the ratchet teeth 40—42 and engaging the ratchet teeth 39—41. The spring 44 is heavier and of greater strength than the spring 43 whereby to overcome and dominate the action of the spring 43 when the shift rod 45 is in its forward drive position shown in Fig. 4. Accordingly, the spring 44 has sufficient strength to maintain the ratchet teeth 39—41 in driving engagement except when the rear wheels tend to overrun the front wheels, in which event, the spring 44 yields to allow the teeth 39 to be cammed out of engagement with the teeth 41 to accommodate the overrun.

If a vehicle equipped with a transmission control mechanism herein disclosed were being driven forward and the brakes were suddenly applied under bumpy road conditions, the gear 31, its shifter fork 46 with its yoke 460 could accidentally and suddenly slide from their forward drive position toward their reverse drive position. If the gear could move all of the way to the reverse position it would result in stripping of gears. To avoid such an occurrence, the stop ring 56 is so located on the shift rod 45 and the spacer element 52 is of such length that, in the event an extreme road shock occurs when the vehicle is in forward motion tending to cause extreme unauthorized axial movement of the gear 31, the annular shoulder 54 of the spacer element 52 will abut against the stop ring 56 and arrest axial movement of the shifter fork 46 and the gear 31 toward their reverse drive position before any unauthorized engagement of reverse ratchet teeth 40 and 42 occurs.

The overrunning clutch drive alone is insufficient in itself to free the steerable wheels from driving traction at times when front wheel drive is not wanted as, for example, when the vehicle is traveling in a straight ahead direction on hard road surface. To supplement the action of the one-way clutch in eliminating front wheel drive except under adverse operating conditions a simple gear ratio reduction is provided by forming the gear 31 with at least one more tooth than is formed in its meshing gear 30. A satisfactory speed reduction is obtained, for example, by making the gear 31 with thirty teeth and the gear 30 with twenty-nine teeth. In order that both output shafts 21 and 22 for driving the tandem rear axles will rotate at the same speed, the gear 28 has the same number of teeth as the gear 30. By reason of this step-down gearing the forward drive axle output shaft 23 is always driven at a slower speed than are either of the rear axle output shafts 21 and 22 so that drive to the front axle can only be transmitted in the event the rear wheels spin on the ground surface and thereby tend to overrun the front wheels and which condition is usually encountered only on ice or on soft ground at slow speed.

When the vehicle is operated in the forward direction, power is transmitted from the output shafts 21 and 22 to the rear axles 11 and 12 and the wheels on these axles turn and propel the vehicle so that the wheels on the front axle 16 turn and exert force through the driving gears in the axle to rotate the drive shaft 27 and thus rotate the output shaft 23.

At this time the gear 31 turns in the same direction as the shaft 23. During operation of the vehicle on a hard surfaced road where the wheels of the two rear axles have good traction, these wheels propel the vehicle at a rate such that the wheels of the front axle drive the output shaft 23 at substantially the same rate that the output shafts 21 and 22 are driven. The gear 31 is driven by the gear 30 on output shaft 22, and as the gear 31 is slightly larger than the gear 30, the gear 31 is rotated at a slightly slower rate than the gear 30 and the output shaft 22, and therefore, at a slightly slower rate than the output shaft 23 which is being driven through the front axle at substantially the same rate as the output shafts 21 and 22. The direction of rotation of the output shaft 23 and the gear 31 at this time is such that the ratchet teeth 41 overrun the teeth 39 and permit the shaft 23 to turn relative to the gear 31.

Under adverse driving conditions in which the wheels of the rear axles 11 and 12 have poor traction, these wheels propel the vehicle at a less rapid rate and the wheels of the vehicle front axle are not rotated fast enough to cause the shaft 23 to turn faster than the gear 31. Hence, the ratchet teeth 39 on the gear 31 engage the teeth 41 so the gear 31 drives the shaft 23, and therefore drives the wheels of the front axle so that these wheels help to propel the vehicle.

The wheels of the front axle continue to be driven until driving conditions again are such that the wheels of the rear axles propel the vehicle fast enough to cause the output shaft 23 to be rotated more rapidly than the gear 31, whereupon the application of driving force to the wheels of the front axle is automatically discontinued.

The equipment operates in a similar manner when the vehicle is being driven in the reverse direction. At this time the gear 31 is held by the spring 43 in the position in which the ratchet teeth 40 and 42 are operative. Under normal driving conditions the shaft 23 is driven by the vehicle wheels at a more rapid rate than the gear 31, and the teeth 42 overrun the teeth 40. Under adverse driving conditions the shaft 23 is not driven by the vehicle wheels fast enough to overrun the gear 31, and the teeth 40 engage the teeth 42 and cause the gear 31 to drive the shaft 23 and thus apply driving force to the wheels of the vehicle front axle.

In the event the gearbox or main transmission employed to drive the vehicle through the power divider unit 17 is of the "Hydra-Matic" type or of such other type that requires the main transmission to be shifted to neutral before the vehicle engine can be started, the main transmission may not be able to be shifted to neutral if the engine is stalled while the vehicle is moving forward in gear on a grade or incline and there is a toothed loading of the ratchet teeth upon stalling due to back slip of the vehicle. This is because it is impossible to apply sufficient force through the shift rod 45 to overcome the frictional resistance of the ratchet teeth to accomplish disengagement thereof when the ratchet teeth are under heavy static load.

To overcome the foregoing operational difficulty, a linkage of the type disclosed in Figs. 5–8 inclusive is preferably provided which connects the main transmission shift lever to the shift rod 45 of the power divider unit 17. This linkage includes an overtravel or lost motion which permits the main transmission shift lever to be placed in neutral to start the engine, even though the power divider unit 17 has its ratchets engaged. After the vehicle engine is started, the tooth loading of the ratchets is relieved by shifting the main transmission to reverse, after which the gear 31 of the power divider unit shifts as it would normally shift under normal operating conditions.

Referring now particularly to Figs. 5–8 inclusive, the shift rod 45 of the power divider unit 17 which extends from the sleeve 49 thereof is slidably shifted by suitable linkage mechanism, preferably of the type shown. The shift rod 45 is shifted along its longitudinal axis to and from its forward drive and reverse drive positions responsive to the movement of a link rod 60 operated by the movement of the main transmission shift lever from reverse to any forward drive or its neutral position.

A torsion rod 61 is journaled in spaced brackets 62 and 620 secured to transverse vehicle frame members 63 and 630 respectively, the said torsion rod 61 being prevented from longitudinal displacement in respect to the brackets 62 and 620 by suitable cotter pins 64 and washers 65. A shift rod actuating lever 67 is welded or otherwise fixed to the torsion rod 61 near the right hand end thereof as viewed in Fig. 6 and has its outer end connected to the shift rod 45 by means of a shift rod link 68 and link pins 69 and 690. An ear 670 of the lever 67 shown in Fig. 5 extends over the link 68 to serve as a stop and prevents excessive clockwise movement thereof around the link pin 69 which would tend otherwise to move the shift rod 45 after being shifted to its forward drive position and arriving at its detent 50. Movement of the shift rod actuating lever 67 counterclockwise as viewed in Fig. 5 moves the shift rod 45 from its forward drive position to its reverse drive position. The lever 67 and link 68 form an over-center toggle lock limited in travel by the stop 670 which positively precludes engagement of reverse ratchets 40 and 42 when the vehicle is in forward motion.

Journaled on the torsion rod 61 is a U-shaped lever 70 having an extended arm 71 and a short arm 72, the torsion rod 61 extending through opposite apertures 710 and 720 in the said arms 71 and 72 respectively. The extended arm 71 is pin connected by a link pin 73 extending through an aperture 7100 therein to the link rod 60 which is operated by the movement of the main transmission shift lever. A washer 74 is disposed between the long arm 71 of the U-shaped lever 70 and the adjacent bracket 62 and between the shift rod actuating lever 67 and the adjacent bracket 620. A contact element 75 is welded or otherwise secured to the torsion rod 61 in spaced relationship to the short arm 72 of the U-shaped lever 70, the said contact element having a pair of angularly spaced contact arms 76 and 77 radially spaced from the torsion rod 61, one of said contact arms being positioned in spaced relationship each side of the short arm 72 of the U-shaped lever 70. A torsion spring 78 is disposed in spaced relationship around the torsion rod 61 between the short arm 72 of the U-shaped lever 70 and the contact element 75 with one end thereof hooked into a spring notch 7200 of the short arm 72 of the U-shaped lever 70 and the other end thereof hooked into a spring notch 7500 of the contact element 75.

The arcuate dot and dash line 80 indicates the path of movement of the link pin 73 connecting the link rod 60 to the extended arm 71 of the U-shaped lever 70. The points R, F2, F1 and N on the dot and dash line 80 show the positions of the link pin 73 and the U-shaped lever 70 when the main transmission shift lever is in its reverse, second forward speed, first forward speed and neutral positions. The dot and dash line 81 indicates the path of movement of the link pin 69 connecting the shift rod actuating lever 67 to the shift rod link 68, the points R, F2, F1 and N corresponding to like designated positions of the U-shaped lever 70 which the shift rod actuating lever 67 assumes as hereinafter described, except, however, because of the fact that the ear 670 of the shift rod actuating lever 67 contacts the link 68, the clockwise travel of the said shift rod actuating lever 67 is limited to its first forward speed position as shown in Fig. 5.

The torsion spring 78 constantly urges the shift rod actuating lever 67 towards its F1 position whereat the shift rod 45 is in its forward drive position as shown in Figs. 4, 5, and 6. Because of the spacing of the contact arms 76 and 77 of the contact element 75, the movement of the U-shaped lever 70 will not move the shift rod 45 out of its forward drive position when the said U-shaped lever 70 is moved from neutral to first forward speed or second forward speed positions. However, movement of the U-shaped lever 70 to its reverse position will move the shift rod 45 out of its forward drive position to its reverse drive position as the result of the contact arm 76 of the contact element 75 being contacted by the short arm 72 of the U-shaped lever 70. The contact arm 77 of the contact element 75 is contacted by the short arm 72 of the U-shaped lever 70 to assure movement of the shift rod 45 out of its reverse position when the U-shaped lever 70 is moved out of its reverse position by the link rod 60.

Also, because of the lost motion linkage between the U-shaped lever 70 and the shift rod actuating lever 67 through the contact element 75, the shifting mechanism of the main transmission may be shifted from any forward speed setting to neutral even though the shift rod 45 becomes locked in its forward drive position due to the stalling of the engine while the vehicle is moving forward in gear on a grade or incline and there is a toothed loading of the ratchet teeth in the power divider unit 17 upon stalling.

Although but one embodiment of the invention has been disclosed and described in detail, it is obvious that many changes may be made in the size, shape, arrangement and details of the various elements of the invention, all without departing from the spirit and scope of the invention as defined by the appended claims.

I claim:

1. In a forward and reverse selective drive mechanism for motor vehicles including a driven shaft, a shiftable drive element slidably journaled on said driven shaft, a pair of overrunning clutches on each side of said drive element, each clutch having one clutch member on said drive element and the other clutch member on the driven shaft, a shifter mechanism including a slidable shift rod, a shift element slidably mounted on said shift rod engaging said drive element to shift said drive element selectively into clutched engagement with one or the other of said clutch members on said driven shaft, spring elements disposed on said shift rod, one of said spring elements being disposed on each side of said shift element tending to bias the said drive element into overrunning clutch engagement with one or the other of said clutch members on said driven shaft, one of said springs being stronger than the other and thereby taking the other spring out of effective operation when said shift rod is shifted to one position, means carried on said shift rod adapted to engage the stronger spring taking it out of effective operation when the shift rod is shifted to the other position, and stop means carried by said shift rod limiting the extent of movement of the drive element toward one of said clutch members on said drive shaft responsive to vehicle road shocks when the other of said clutch members on said drive shaft is resiliently engaged.

2. In a forward and reverse selective drive mechanism for motor vehicles including an engine, and a transmission means having manual selective control mechanism therefor movable to reverse, forward speed and neutral settings, a power divider unit driven by said transmission including an input shaft, an output shaft and a shiftable gear element rotatably mounted on said output shaft, an overrunning clutch on each side of said shiftable gear element, each clutch having one clutch member on said shiftable gear element and the other clutch member on said output shaft, a shifter mechanism including a slidable shift rod movable by said transmission selective control mechanism into forward and reverse drive positions, a shift element slidably spring loaded on said shift rod engaging said drive element to shift the drive element into resilient clutch engagement with one or the other of the clutch members on said output shaft responsive to selective movement of said shift rod, and stop means carried by said shift rod limiting the extent of movement of the shift element and the shiftable gear element toward one of said clutch members on said output shaft responsive to vehicle shocks when the shiftable gear element is in resilient engagement with the other clutch member on said output shaft, and lost motion linkage between said manual transmission selective control mechanism and the slidable shift rod of said shifter mechanism permitting shifting of said transmission control mechanism to neutral from any forward speed setting thereof in the event the engine stalls when the vehicle is on a grade and a toothed loading of the engaged clutch occurs.

3. In a device of the character described, a housing, a driven shaft mounted in said housing axially spaced apart overrunning clutch device fixed to said shaft, a gear element shiftably mounted on the shaft between said devices and carrying overrunning clutch devices on opposite sides thereof for cooperation respectively with the first mentioned overrunning clutch devices, a pair of spring devices acting between the housing and the gear element acting in opposition to one another, one tending to bias said gear element in one direction for one-way drive of the shaft in clockwise rotation and the other tending to bias the element in the opposite direction for one-way drive to the shaft in counterclockwise direction, one of said springs being stronger than and thereby normally taking the other spring out of effective operation, control means movable with respect to said gear element engaging the stronger spring to at times take it out of effective operation and thereby allow the other spring to be effective on the gear element, and means incorporated in said control means preventing accidental shifting of the gear element from one of its overrunning positions to the other.

4. In a device of the character described, a housing, a shiftable coupling mounted in said housing, a shifter therefor, a slidably mounted shift rod mounted in said housing on which said shifter is slidably mounted, a detent for said rod to confine the extent of its sliding travel in one direction, a pair of spring devices arranged in said housing to exert their respective forces in opposition on the shifter for control of the sliding travel thereof, one spring device being stronger than the other and thus producing a force exceeding that of the other, means carried by said shift rod in its movement away from its detent for engaging the stronger of the spring devices and thus freeing the shifter from the predominating effort of the stronger of the opposing forces, and stop means carried by said shift rod limiting the extent of the movement of said shifter on said shift rod to prevent shifting of the shiftable coupling responsive to shocks applied externally thereof when said shifter is under control of the predominating effort of the stronger of the opposing forces.

5. In a device of the character described, a support, a shaft carried by said support, a coupling member shiftably mounted on the shaft and provided with a shifter device, cooperating ratchet clutch elements on the shaft and coupling member for drive engagement when said coupling member is shifted in one direction, a first spring between the support and the shifter to bias said member in said one direction, additional cooperating ratchet clutch elements on the shaft and coupling member for drive engagement when said coupling member is shifted in the opposite direction, a second spring between the support and said shifter to bias said coupling member in said opposite direction, the bias force of said first spring being stronger and thus capable of negativing the bias from the second spring, a slidable shifter rod carried by said support on which said shifter is slidably mounted, a slidable element on the shifter rod and interposed between the said shifter and the stronger spring for transmitting force therebetween, and an abutment on said shifter rod operable upon sliding of the rod in said opposite direction to engage and retract said slidable element on said shifter rod for confining the stronger of said biasing springs, and thus render said second spring effective to move said shifter and said coupling in said opposite direction, and a stop on said shifter rod engageable by said slidable element thereon limiting the extent of movement of the coupling member against its spring bias in said opposite direction.

6. In a reversible one-way clutch mechanism having an input shaft adapted to be driven in either direction of rotation, an output shaft, and clutch means adapted to effect one-way drive connection of said output shaft by said input shaft when it is rotated in either direction, a shiftable member adapted to adjust said clutch means to drive said output shaft when it is connected for drive in one direction of rotation or for drive in the other direction of rotation, a manual control element adapted to effect a drive in either direction of rotation of said input shaft or to effect no drive of said input shaft, linkage between said manual control element and said shiftable member, said linkage including a first link movable with said manual control element and a second link movable with said shiftable member, spring means between said links acting to bias the second link in one direction and means carried by said first link effective during movement of said manual control to effect a change in direction of said input shaft to move said second link opposite to said one direction, whereby said linkage transmits movement of said manual control to said shiftable control to adjust said clutch means during effectment of a change in direction of said input shaft, but does not transmit movement during change from a driving to a non driving effectment.

7. In a device of the character described, a reversible one-way clutch mechanism having an input shaft and an output shaft, a pair of alternately engageable overrunning clutches operable to effect one-way drive from said input shaft to said output shaft, one of said clutches for effecting drive of said output shaft when the input shaft is rotating in one direction and the other for effecting drive of the output shaft when the input shaft is rotating in the opposite direction, a clutch control mechanism movable to various positions to effect selective engagement of the overrunning clutches, a manual control element adapted, in movement to various positions, to effect forward, reverse, or neutral drive of said input shaft, lost motion linkage between the manual control element and said clutch control mechanism, said linkage comprising a first member connected to said manual control element and movable therewith in its movement between forward, reverse, and neutral positions, a second member connected to said clutch control mechanism and adapted to move the same between its clutch engagement positions, and an intermediate linkage operatively connecting said first and second members said intermediate linkage comprising resilient means urging said second member to one position to engage one of the overrunning clutches and means carried by said first member during movement to its various positions, said last mentioned means positioned with respect to said second member so as to positively contact and move said second member against said resilient means only during movement of said first member to its reverse position, and thereby move said second member to its other position to engage the other of said overrunning clutches.

8. In a reversible one-way clutch mechanism, a housing, a driven shaft mounted in said housing, a shiftable driven element slidably mounted on said driven shaft, an overrunning clutch on each side of said drive element, each clutch having one clutch member on said shiftable driven element and a cooperating clutch member on the driven shaft, a shifter mechanism for selectively connecting one or the other of said clutches for one-way drive of the driven shaft in one direction of rotation or the other, a first spring device between said housing and said shiftable element normally adapted to urge the element towards one clutch engaging position, a second spring device between said housing and said shiftable element adapted to urge the element towards the other clutch engaging position, said first spring device being stronger than the second spring device and thus capable of moving said element into said one engaging position against the second spring, a control member movably mounted in said housing having means thereon located between said first spring and said shiftable elements, said means, upon movement of the member in one direction, engaging said first spring to render it ineffectual to urge said driven element and thus to render said second spring effective to urge said element into its other clutch engaging position.

9. The device as claimed in claim 8 including stop means on said control member engageable with said shiftable element upon movement of the same out of said one clutch engaging position towards its other engaging position, means on said housing adapted to hold said control member from movement and thus limit the movement of said shiftable element out of said one clutch engaging position after said shiftable element has engaged said stop means, whereby accidental shifting of the shiftable element from said one clutch engaging position to the other engaging position is prevented.

10. In a reversible one-way clutch mechanism for effecting a one-way drive of an output shaft from an input shaft in either direction of rotation, a pair of overrunning clutches, the first clutch adapted to effect a one-way drive from said input shaft to said output shaft when the input shaft is rotating in one direction and the second clutch adapted to effect a one-way drive from said input shaft to said output shaft when the input shaft is rotating in the opposite direction; control means for said clutches including a shiftable clutch engaging element, a first resilient means located adjacent to said element normally urging said shiftable element to engage said first clutch, a second resilient means located adjacent to said element urging the shiftable element to engage said second clutch, said first resilient means being stronger than the second, a movable member upon movement in one direction rendering said first resilient means inoperative and thus rendering said second resilient means effective to urge said shiftable element to engage said second clutch, and upon movement in the other direction to render said first resilient means operative thus permitting the latter to overcome the second resilient means and urge the shiftable element to engage said first clutch.

11. The device as claimed in claim 10 including means to hold said movable member in position to render the first resilient means effective, stop means on said movable member adapted to engage and limit the movement of said shiftable element upon movement of the latter out of position to engage said first clutch, whereby accidental engagement of the second clutch is prevented.

12. The device as claimed in claim 11 wherein said means to hold said movable member includes a toggle mechanism adapted to hold the movable member in position to render the first resilient means effective to overcome said second resilient means and thus move said shiftable element to engage said first clutch.

13. In a reversible one way clutch mechanism having an input shaft, an output shaft, and a pair of overrunning clutches adapted to connect the input shaft for driving the output shaft in either of opposite directions, a shiftable member adapted selectively to effect engagement of one or the other of said clutches, a control member having a given range of movement, lost motion linkage between said manual control member and said shiftable member, said linkage comprising a first link movable with said control member and a second link movable with said shiftable member, spring means connecting said links acting to bias said second link to move said shiftable member to effect engagement of one of the clutches, said first link having an element engageable with said second link during a portion of said range of movement of said control member, said element acting to move said second link and said shiftable member to engage the other of said clutches, whereby said linkage imparts movement from the control member to the shiftable member in movement through said portion but does not impart movement to the shiftable member in movement through other portions of said range.

References Cited in the file of this patent

UNITED STATES PATENTS

| 1,874,995 | Heinauer | Aug. 30, 1932 |
| 2,019,073 | Cooper et al. | Oct. 29, 1935 |
| 2,107,072 | Herrington | Feb. 1, 1938 |
| 2,154,045 | Herrington | Apr. 11, 1939 |
| 2,290,089 | Bock | July 14, 1942 |
| 2,354,300 | Bock | July 25, 1944 |
| 2,667,251 | Banker | Jan. 26, 1954 |

FOREIGN PATENTS

| 589,182 | Germany | Dec. 6, 1933 |
| 828,681 | France | Feb. 21, 1938 |